US008727290B1

United States Patent
De La Matta et al.

(10) Patent No.: US 8,727,290 B1
(45) Date of Patent: May 20, 2014

(54) FLAT TOUCH SCREEN MOUNTING SYSTEM AND METHOD

(76) Inventors: Carlos De La Matta, Brandon, FL (US); Mohamad Samhoury, Wesley Chapel, FL (US)

( * ) Notice: Subject to any disclaimer, the term of this patent is extended or adjusted under 35 U.S.C. 154(b) by 19 days.

(21) Appl. No.: 13/208,026

(22) Filed: Aug. 11, 2011

Related U.S. Application Data

(60) Provisional application No. 61/372,682, filed on Aug. 11, 2010.

(51) Int. Cl.
*F16M 11/40* (2006.01)
*A47G 1/17* (2006.01)

(52) U.S. Cl.
USPC ............. 248/160; 248/122.1; 248/206.5; 248/309.4; 248/683.1; 379/454

(58) Field of Classification Search
USPC ........... 248/206.5, 683, 309.4, 160, 122.1, 248/309.1, 917, 274.1, 447, 447.1, 447.2; 361/679.06, 679.22, 681; 224/183, 224/562; 379/446, 454, 455
See application file for complete search history.

(56) References Cited

U.S. PATENT DOCUMENTS

| | | | | |
|---|---|---|---|---|
| 2,784,261 | A * | 3/1957 | Anklesaria | 379/455 |
| 5,465,932 | A * | 11/1995 | Richter | 248/160 |
| D502,956 | S * | 3/2005 | Holmes et al. | D16/242 |
| 6,888,940 | B1 * | 5/2005 | Deppen | 379/446 |
| 7,431,251 | B2 * | 10/2008 | Carnevali | 248/206.5 |
| 7,773,371 | B2 * | 8/2010 | Hillman et al. | 361/679.06 |
| D654,054 | S * | 2/2012 | Kohte et al. | D14/217 |
| 2011/0177592 | A1 * | 7/2011 | Faustman et al. | 435/325 |
| 2012/0273630 | A1 * | 11/2012 | Gillespie-Brown et al. | 248/122.1 |

* cited by examiner

*Primary Examiner* — Tan Le
(74) *Attorney, Agent, or Firm* — John Rizvi; Gold & Rizvi, P.A.

(57) ABSTRACT

The present invention is directed to a mounting device for supporting a tablet computer while freeing the hands of a user. The mounting device includes an attaching means for temporary or permanently attaching the system to a surface or object, a holding device for safely holding the tablet computer in place, and a flexible connector attached to the holding device via a swivel joint connector and extending between the holding device and attaching means. The swivel joint and flexible connector provide the combinational benefit of adjusting the position of the tablet computer. The attaching means may include a wall mount or spring clamp. The holding device includes a number of different embodiments one of which includes a pair of audio speakers.

12 Claims, 7 Drawing Sheets

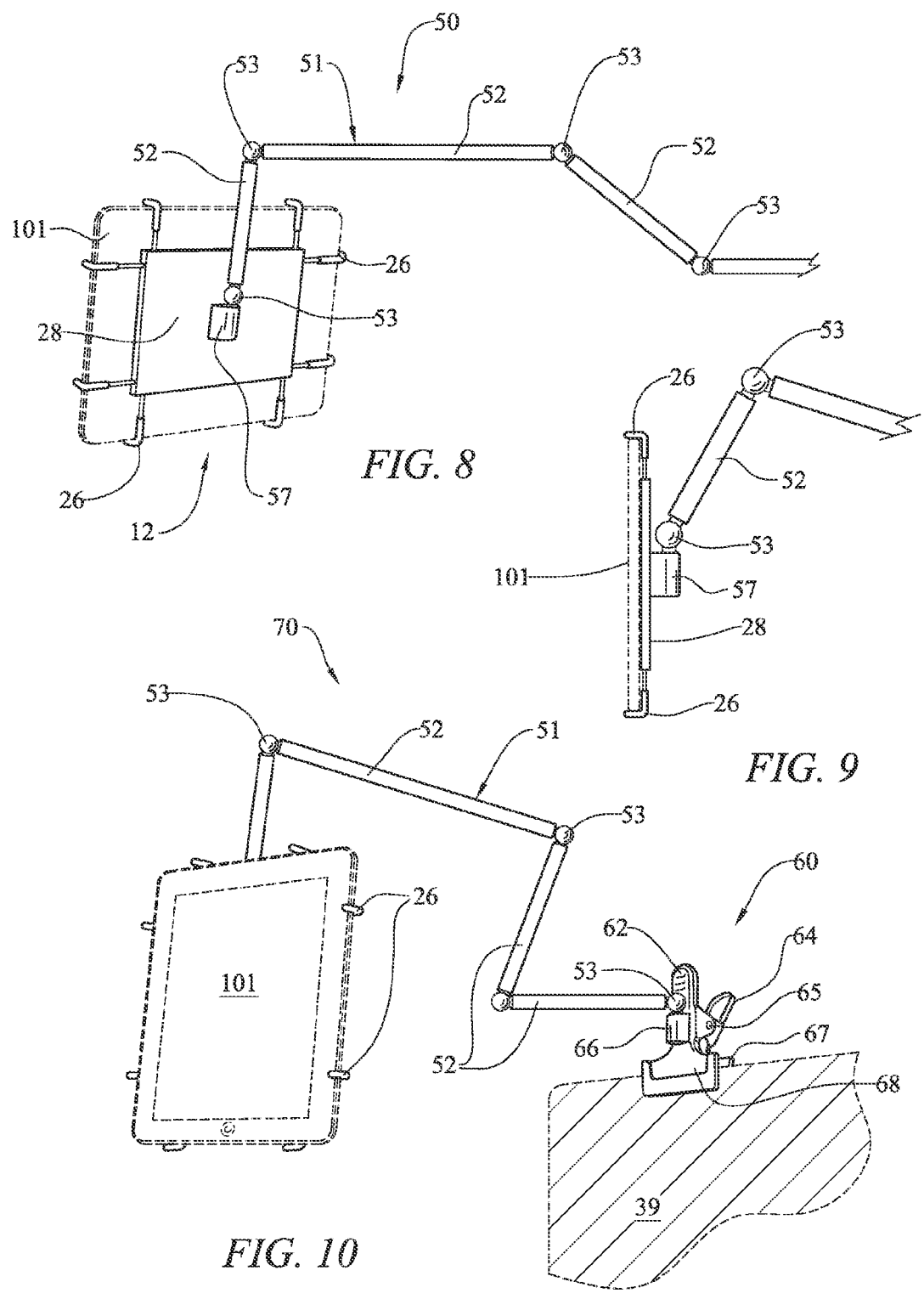

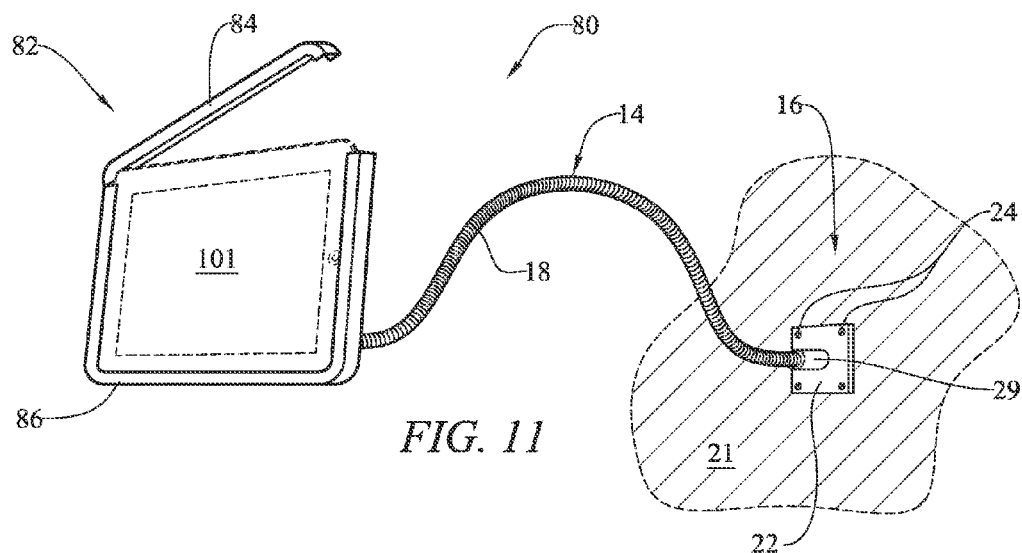
FIG. 11
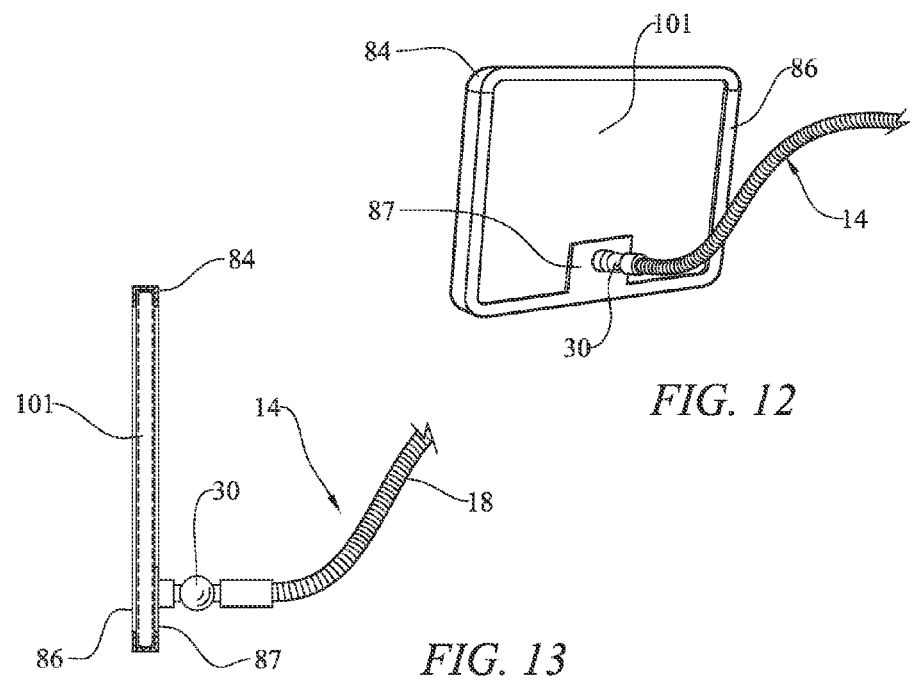
FIG. 12
FIG. 13

FLAT TOUCH SCREEN MOUNTING SYSTEM AND METHOD

CROSS-REFERENCE TO RELATED APPLICATIONS

This application claims priority to U.S. Provisional Application Ser. No. 61/372,682, filed Aug. 11, 2010, and entitled, "Flat Touch Screen Mounting System & Method, the entire subject matter of the provisional application is incorporated by reference herein.

FIELD OF THE INVENTION

The present invention relates generally to mounting systems. More particularly, the present disclosure relates to a mounting system and method for holding an electronic device including but not limited to a tablet computer such as an iPad®, gPad, HP Slate, etc., where a user can easily adjust the positioning of the device and operate the device without having to hold the electronic device in the user's hands at all times.

DESCRIPTION OF THE PRIOR ART

With the advent of advancing technologies, the advantages of size and portability of electronic devices have allowed consumers to readily access a diversity of media and the internet. One electronic device that has since dominated the market is the tablet computer, often referred to as a tablet. Generally, the tablet is a computer having memory, a processor, and a fiat multi-touch display screen instead of a keyboard or mouse. A user simply touches the flat screen with an instrument or the tip of a finger to navigate the functional parameters of the tablet. The tablet computers typically provide a variety of media sources that include electronic books, movies, videos, music, the ability to play games, surf the World Wide Web, access e-mail, run applications, and many have limited word processing capabilities. The tablet device is often interconnected to the internet using Wi-Fi or a 3G mobile data connection. The tablet allows the user to browse the Internet, load and stream media, access videos and television programs, and run a variety of software programs. The multitasking function of the tablets allow consumers to perform a variety of different functions at once such as read a newspaper, or play games, while listening to music or browsing the internet.

When using the electronic tablet, it is typically necessary to hold the device with one or both hands. Most often, a user will hold a tablet computer in one hand while using the fingers of another hand to input data or select program applications, via the flat touch screen. On many occasions the user will hold the table computer with both hands when using the electronic tablet for reading a magazine, newspaper, book or e-mail messages. Holding the tablet computer in hand for prolonged periods of time can cause strain and stress on the user's muscles making it uncomfortable and unpleasant over long periods of time. Although most electronic tablets are lightweight, there are limited options available that permit a user to use the tablet while freeing the individual's hands.

A variety of mounting devices have been designed to accommodate the use of electronic devices without the need of having to hold the device in hand. For example, many mounting devices having been implemented to hold a variety of devices such as work lights umbrellas, tools, baby bottles, TV sets, music players, books, etc. . . . . Conventional mounting devices or supports typically including a number of rigid, extensions connected to a horizontal platform for resting the device on the platform. Many mounting devices provide no or little adjustability, comprise floor stands having inclined bases, or include a number of parts that require assembly.

Many prior art mounting devices or supports are designed to be used with heavy objects and often comprise larger, heavier frame members or include mounting brackets that are too bulky and cumbersome to be uses with smaller, lightweight electronic devices. Mounting devices have also been introduced for holding smaller electronic devices such as cell phones, notebook computers, or PDAs. However, such devices often include a smaller sized base attached to the end of an extension member. The base includes clamps, spring holders, or locking holders that are used to securely hold the smaller devices in place on the base. A user must negotiate the clamps or holders when removing the device from the base. Further, many mounting devices offer limited adjustability making it difficult for a user to easily positioned the electronic device in front of them. Other mounting systems encourage the use of cradles, pockets, brackets or fasteners that are attached to both the electronic device and to an extending arm for mating connection together so as to secure the electronic device in place. Thus, the prior art mounting devices for mounting smaller electronic devices require a number of parts to secure the device in place, diminish the ease of mounting and dismounting electronic devices to holders, are limited in adjustability, or are generally not compatible for use with larger electronic devices such as tablet computers.

Accordingly, although the mounting devices of the prior art address some of the needs of the market, what is desired is a mounting system that is designed to releasably hold a tablet computer, provides adjustability, and permits a user to mount and dismount the tablet computer with ease.

SUMMARY OF THE INVENTION

In one general aspect of the present invention, there is provided an adjustable mounting system for holding an electronic device, where the adjustable mounting system comprises a holding device including a back plate and a plurality of fingers extending from the back plate, the plurality of fingers releasably engaging with the electronic device to secure the electronic device in place, a flexible connector having a first end attached to the back plate via a joint connector, and second end, and an attachment coupled to the second end of said flexible connector where the attachment is affixed to a surface or object.

The plurality of fingers includes a first set of fingers extending upwardly from a top lateral edge of the back plate, and a second set of fingers extending downwardly from a bottom lateral edge of the back plane where the second set of fingers are aligned opposite the first set of fingers. The plurality of fingers further includes a third set of fingers extending horizontally from a longitudinal right side edge of the back plane, and a further set of fingers extending horizontally from a longitudinal left side edge of the back plane where the fourth set of fingers are aligned opposite the third set of fingers. Each of the plurality of fingers includes an L-shaped configuration, and each of said plurality of fingers including a foam, rubber or elastic coating.

The flexible connector includes a bendable metal rod surrounded by a corrugated, sheath. Alternatively, the flexible connector includes a plurality of segments, each of the plurality of segments including a male connector disposed at one end and a female connector disposed at another end, opposite the one end. Each of the male connectors includes two prongs and a releasable mechanism, and each of the female connectors includes two apertures for receiving the two prongs therein. The plurality of segments are selectively coupled together or decoupled, via the male and female connectors, to increase or decrease the length of the flexible connector.

A second aspect of the invention provides a tablet computer mounting device comprising a holding unit including a cavity and a rubber overmold disposed around a perimeter of the cavity, where the rubber overmold frictionally engages with the tablet computer when the tablet computer is releasably mounted within the cavity, a magnetic attachment including a threaded collar having a plurality of apertures and a plurality of magnets disposed in the plurality of apertures, the magnetic attachment being releasably attached to the holding unit, and a flexible gooseneck having a first end attached to the threaded collar and a second end attached to a wall mount, spring clamp or base holder.

In yet another aspect of the invention, there is provided an electronic device holder comprising a support frame including a U-shaped member releasably holding an electronic device, a flexible arm having one end attached to the U-shaped member via a joint connector, and an attachment coupled to another end of the flexible arm where the attachment is permanently or temporarily attached to a wall, surface or object.

In still another aspect of the invention, the support frame includes a U-shaped member and a closure that is pivotably attached to the U-shaped member. The U-shaped member includes a slot for receiving a tablet computer and the closure is closed to securely hold the tablet in place within the slot.

In yet another aspect of the invention, the holding device includes a pair of speakers that are attached to the holding device or are incorporated within the holding device, and are electrically coupled to the tablet computer.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 8 is a rear perspective partial view of the embodiment of FIG. 7 showing the detail a holding device.

FIG. 9 is a side partial view of the embodiment of FIG. 8, showing the side of the holding device.

FIG. 10 is a perspective view of a mounting system, showing a mounting connector including a spring clamp and articulated members moving relatively to joints, in accordance with yet another embodiment of the present invention.

FIG. 11 is a perspective partial view of a mounting system, showing an alternative of a holding device, in accordance with another embodiment of the present invention.

FIG. 12 is a rear perspective partial view of the holding device of FIG. 11.

FIG. 13 is a side elevational partial view of the embodiment of FIG. 11.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
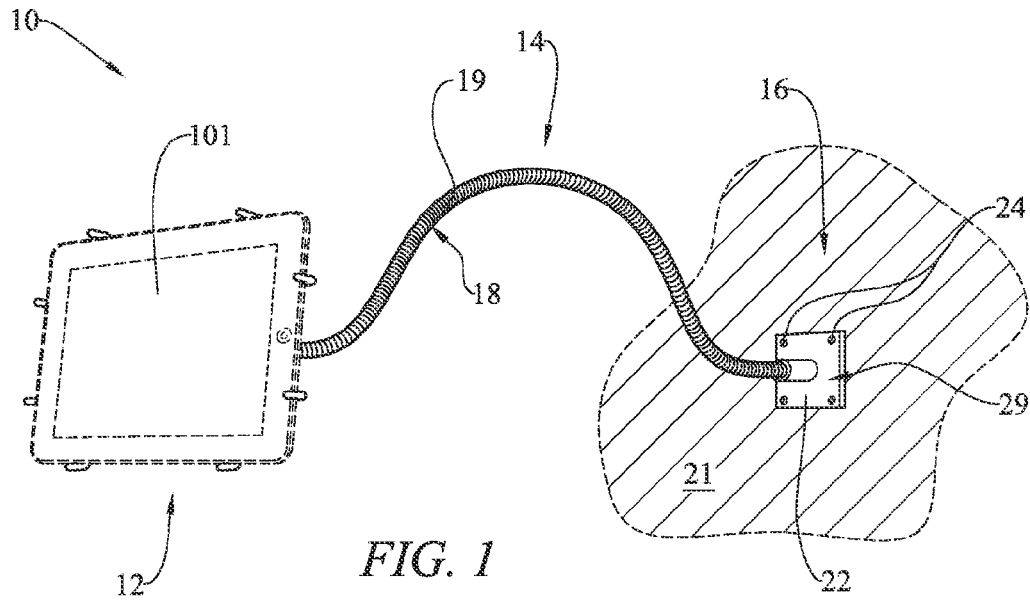
FIG. 1 is a perspective view of a mounting system, in accordance with one embodiment of the present invention.

Referring now to the figures wherein like numerals are shown throughout, there is shown in FIG. 1 a perspective view of a mounting system, in accordance with one embodiment of the present invention. The mounting system, generally denoted at 10, includes a holding device 12 for holding an electronic device 101, an attaching means 16, and a flexible connector 14 extending between the holding device 12 and the attaching means 16.

The exemplary embodiment of the present invention includes a variety of different embodiments directed to a mounting system 10 for holding an electronic device 101, such as a tablet computer. However, it will be noted that the embodiments of the present invention may be adapted to provide a mounting system 10 for holding a number different electronic devices 101 including, but not limited to, a GPS, a PDA, a portable game console, smart phones, cell phones, notebook computers, a variety of differently sized tablet computers, or even calculators.

The flexible connector 14 includes a flexible or bendable rod or shaft 19 that is surrounded by a corrugated, plastic sheath 18. The rod 19 may be a solid Or braided, or include a plurality of joined members or links that are sequentially coupled together to provide flexible movement. Flexible shaft 19 may be fabricated from aluminum, metal, a bendable plastic, or any other suitable material that is capable of withstanding repetitive bending. The diameter and length of the rod 19 is selected to provide a durable, adjustable method of holding and supporting the weight of an electronic device 101 when placed within a holding device 12.

Figure 3:
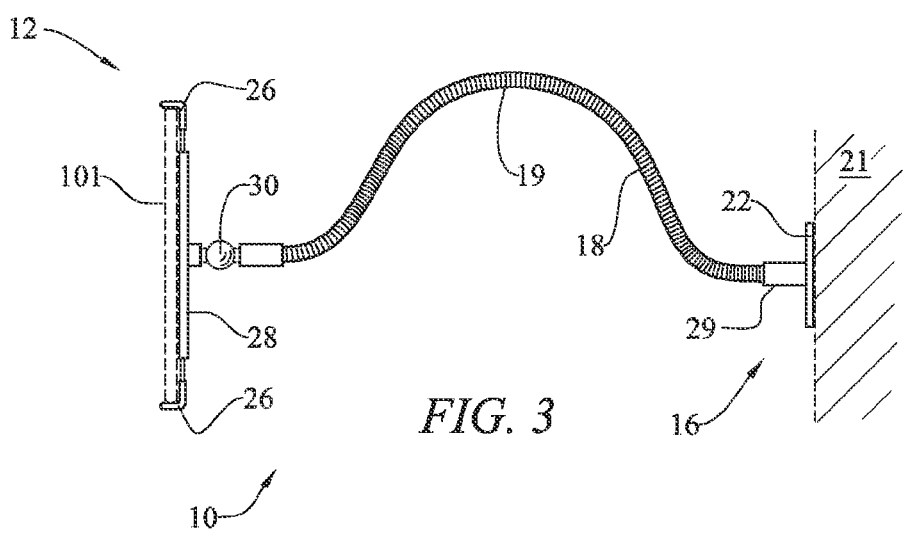
FIG. 3 is a side elevational view of the embodiment of FIG. 1.

As better illustrated in FIG. 3, a joint coupling 27 is disposed at the proximal end of flexible connector 14 for attaching the proximal end of the flexible connector 14 to holding device 12, via a joint 30. Joint coupling 27 includes an aperture for securely receiving and attaching the proximal end of the rod 19 and plastic sheath 18 therein. As seen in FIG. 3, joint 30 is also coupled to back plate 28 of the holding device 12. Joint 30 permits the holding device 12 to rotate freely about the proximal end of the flexible connector 14. This permits a user to easily adjust the angle of the tablet computer 101 about a multi-axis plane when viewing or operating the tablet 101. The joint 30 may comprise any one of a swivel flange, a ball and socket joint, a splined universal joint, a swivel connector, a locking hinge, a swivel bayonet connection, a ball swivel, or any other suitable connection that allows the holding device 12 to pivot about a multi-axis plane at the end of the flexible connector 14. In a preferred embodiment, the mounting system 10 of the present invention utilizes a swivel ball, A swivel compression joint may also be implemented. The swivel compression joint may include a pair of mating members that are adjustably locked together by a wing nut to prevent the compression joint from swiveling when tightened. The mating members may comprise a first member having raised, radial teeth on one side, and a second member having grooves aligned to receive the teeth therein.

With reference made to FIG. 1, one exemplary embodiment of the attaching means 16 includes a wall mount having a rigid flat base 22 including a plurality of holes 24 for receiving screws or nails (not shown) therein, and a tubular boss 29 having a counter bore that is sized to securely hold one end of the flexible rod 19 and plastic sheath 18 therein. The rod 19 may be secured within the tubular boss 29 by threads, mechanical fasteners, or by soldering or welding, such as by ultrasonic welding. Base 22 comprises a generally square shape, and is fabricated from a metal, steel, or plastic. Tubular boss 29 may be integrally formed with, or separately attached to, base 22. Base 22 is easily mounted to a watt 21 by inserting screws or nails within corresponding holes 24 and fastening the screws or inserting the nails within the wall 21 accordingly. This configuration is especially useful for permanently fixing the mounting system 10 in one place.

Figure 2:
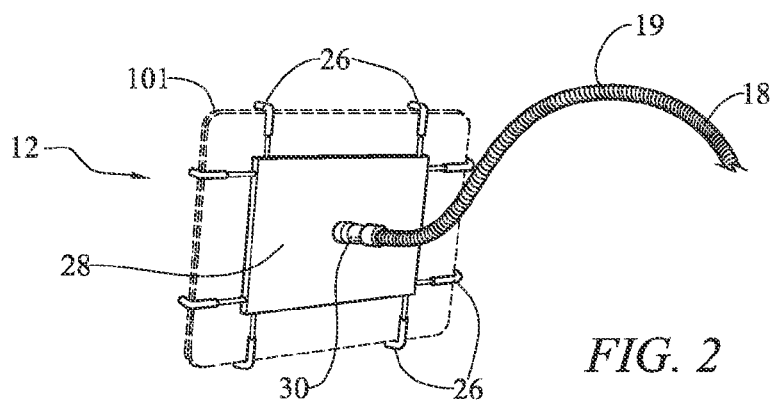
FIG. 2 is a rear perspective partial view of the embodiment of FIG. 1 showing in more detail a holding device of the mounting system of the present invention.

As better illustrated in FIGS. 1 and 2, holding device 12 includes a generally, rectangular back plate 28, having a plurality of fingers 26 selectively disposed along the outer perimeter of the back plate 28 for securely retaining an electronic device 101 in place. Preferably, back plate 28 is fabricated from a lightweight plastic material, however, the plate 28 can be fabricated from any one of a rigid rubber, metal or steel. Further, back plate 28 may also include a rubber or foam padding attached to the inner surface of the plate 28 to help protect the engaging surface of the electronic device 101 when the device 101 butts against the plate 28. Back plate 28 may comprise any size or shape and may also include one or more panels (now shown) that are adjustably attached to the plate 12 for increasing or decreasing the holding cavity of the holding device 12. For example, the back plate 28 may include two panels, one or more vertical panels coaxially coupled to the plate 28 for adjusting the vertical length of the back plate 28, and/or one or more horizontal panels coaxially coupled to the back plate 28 for adjusting the horizontal length of the back plate 28. In addition, back plate 28 may include one or more openings (not shown) formed within the back plate 28 for allowing a user to access the rear portion of the electronic device 101 such as fir plugging the device 101 into a wall outlet, or for connecting interface cables to the device 101, and may also include apertures or holes to permit heat dissipation from the tablet 101.

The plurality of fingers or grippers 26 are shown extending from the corner regions of the back plate 28. In one non-limiting example, a first set of fingers extend vertically upwards from a top edge of plate 28, and a second set of fingers extend vertically downwards from a bottom edge of the plate 28, where the second set of fingers are correspondingly aligned opposite the first set of fingers. A third set of fingers extend horizontally from the right side edge of the plate 28, and a fourth set of fingers extend horizontally from the left side edge of the plate 28, where the fourth set of fingers are correspondingly aligned opposite the third set of fingers. As shown, each finger 26 comprises an L-shaped configuration where the shorter legs of the L-shaped fingers 26 extend in a forward direction to frictionally engage with the circumferential perimeter of a tablet computer 101, as illustrated in FIGS. 1-3, holding the tablet 101 firmly in place. Advantageously, the fingers 26 hold the tablet computer 101 in place, and do not interfere with the touch screen or restrict a user from accessing the touch screen of the tablet 101.

Each finger 26 may include a rubber or elastic sleeve, a foam cushion, or a frictional gripping material to help protect the outer perimeter of the electronic device 101, and to enhance the frictional engagement of the fingers 26 with the perimeter of the tablet computer 101. Fingers 26 may be constructed from any one of plastic, metal, steel, aluminum, or any other suitable material. In yet another embodiment, fingers 26 may be adjustable to increase or decrease the size of the holding cavity of the holding device 12. For example, each finger 26 may be axially adjustable, or have telescoping features, to adjust the holding cavity of the holding, device 12 so that the holding device 12 can be sized to hold electronic devices 101 of different sizes.

Figure 4:
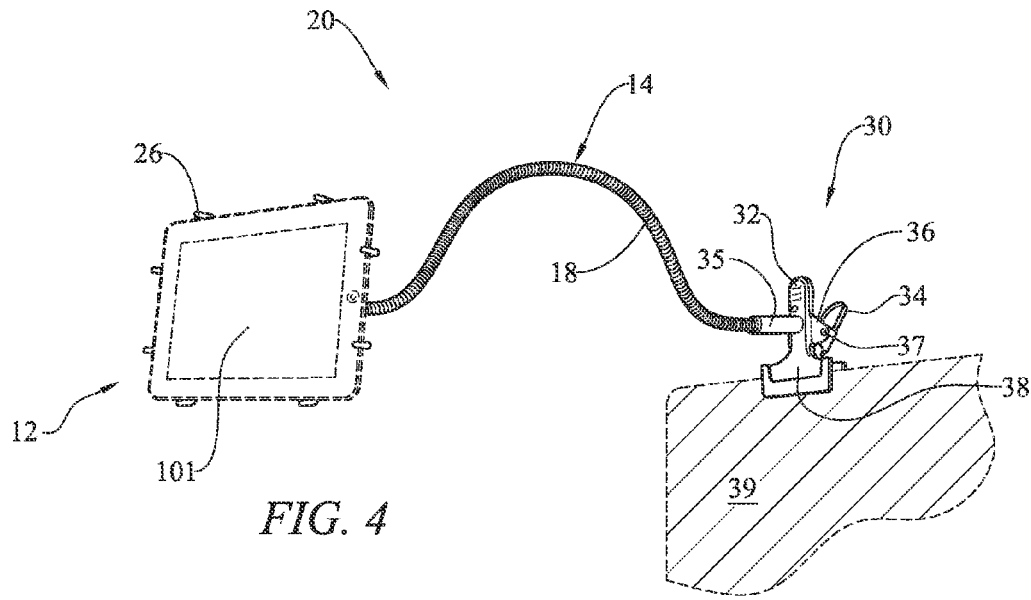
FIG. 4 is a perspective view of a mounting system, in accordance with another embodiment of the present invention.

Turning now to FIG. 4, there is shown a perspective view of a mounting system 20, in accordance with another embodiment of the present invention. The mounting system 20 includes a holding device 12, an attaching means 30, and a flexible connector 14 extending between the holding device 12 and attaching means 30. The holding device 12 and flexible connector 14 include the same features and elements as described above in regards to the holding device 12 and flexible connector 14 of FIGS. 1-3. The main difference in this embodiment is that the attaching means 30 comprises a spring clamp. Spring clamp 30 includes a first jaw member 32 pivotably attached to a second jaw member 34, via a compression spring 36. When a user rotates the jaws 32, 34 around the fulcrum 36, the holding device is opened. The jaws 32, 34 compress together via, the compression spring 36, forcing the holding members 37, 38 to engage a structure 39 such as a desk, chair, bed frame, table, door, drawer, or any other structure in which a user can attach the mounting system 20 for holding an electronic device 101. Spring clamp 30 further includes a tubular boss 35 having an aperture for securely attaching the distal end of flexible connector 14 therein. Spring clamp 30 is functionally sized and structurally sound to allow a user to manipulate or adjust the orientation of the tablet computer 101 without resulting in the holding members 37, 38 loosely disengaging from the structure 39. The spring clamp attachment 30 allows the user to quickly and temporary install the mounting system 20 at different locations. This is especially useful when a user wishes to install the system in different places, moving the system from one room to the other or from one location to the other.

Figure 5:
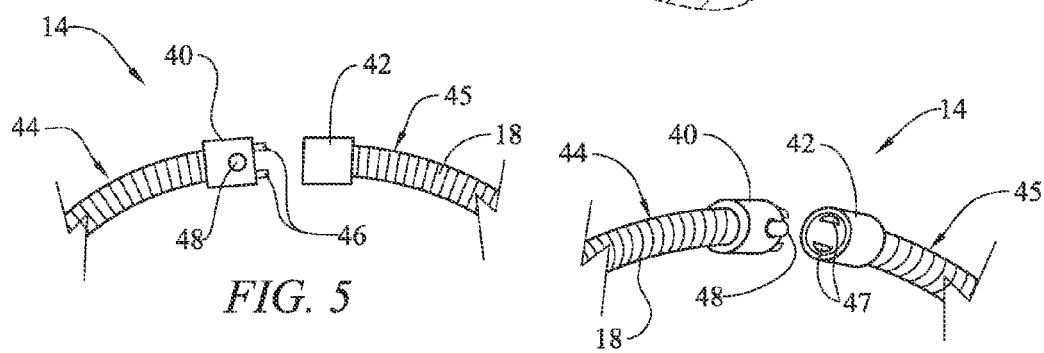
FIGS. 5 and 6 are partial views of a flexible connector of the present invention, showing in detail a coupling system used to adjust the length of the connector, in accordance with still another embodiment of the present invention.
Figure 6:
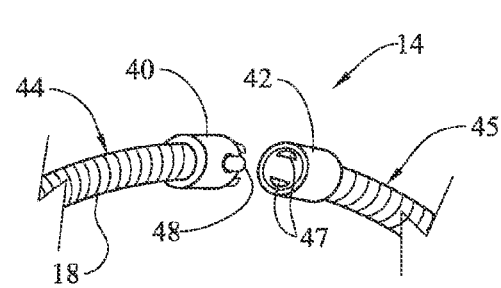

The flexible connector 14, of the present invention, may also include a means for adjusting the length of the connector 14. This benefit is advantageous for adapting the present system to different applications. FIGS. 5 and 6, illustrate this concept by providing an embodiment in which a first segment 44, of the flexible connector 14, includes a male connector 40 having a pair of prongs 46, and a release button 48, and a female connector 42 attached to one end of a second segment 45, of the flexible connector 14, having prong apertures 47 for receiving the prongs 46 therein. The release button 48 secures the engagement of the male connector 40 to the female connector 42 thus preventing the flexible connector 14 from severing under axial, rotational or torsional tension. Thus to lengthen the length of the flexible connector 14, a user can easily interconnect a plurality of segments 44, 45 together via, connectors 40, 42. The user simply activates the release button 48 to separate the segments 44, 45 from each other. Any number of segments may be implemented to increase the length of the flexible connector 14 thus providing a mounting system 10 that is adaptively configured to various applications.

Figure 7:
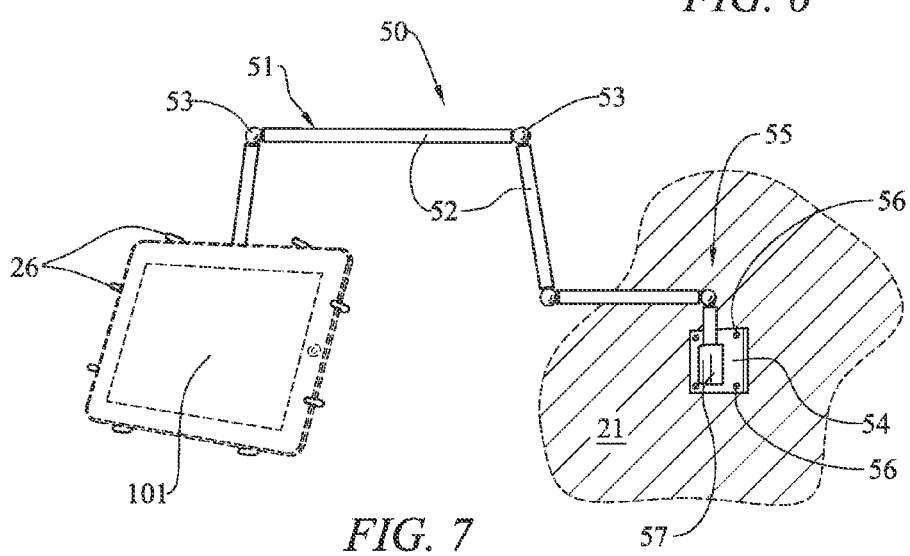
FIG. 7 is a perspective view of a mounting system, showing a set of articulated members moving relatively to joints, in accordance with still another embodiment of the present invention.

Turning to FIGS. 7-9 there are shown perspective and side views of a mounting system 50, in accordance with yet another embodiment of the present invention. The mounting system 50 includes a holding device 12, an attaching means 55, and a flexible connector 51 extending between the holding device 12 and attaching means 55. The flexible connector 51 is defined by a combination of links 52 articulated through joints 53 where each link 52 rotates relative to a connecting joint 53. In the exemplary embodiment, there are 4 links denoted at 52, and 5 joints 53. Links 52 may be constructed from plastic, metal, steel, or aluminum and may comprise all the same length or have different lengths. Joints 53 may comprise metal, steel or plastic swivel balls.

Attaching means 55 includes a wall mount having a rigid flat base 54 including a plurality of holes 56 for receiving screws or nails (not shown) therein, and a flange 57 connector having a short attaching link that is articulated about a joint 53. Base 54 comprises a generally square shape, and is fabricated from a metal, steel, or plastic, and is easily mounted to a wall 21 by inserting screws or nails within corresponding holes 56 and fastening the screws or inserting the nails in the wall 21 accordingly. This configuration is especially useful for permanently fixing the mounting system 50 in one location.

As demonstrated in FIGs. 8 and 9, one end of the flexible connector 51 is attached to the holding device 12 with a link 52 rotatably connected to joint 53. A joint coupling 57 is mounted to back side of plate 28 for mechanically interfacing the back plate 12 with the flexible connector 51. As described earlier in relation to FIGS. 1-3, the holding device 12 includes a plurality of fingers 26 extending from back plate 28 where the fingers 26 engage with the outer perimeter or circumferential edge of the tablet computer 101, firmly holding the tablet 101 in place. A user can easily place the tablet 101 in the holding device 12 and rotate or adjust the holding device 112 along a multiple axis to provide optimum viewing and accessibility while freeing the hands of the user.

With reference now made to FIG. 10, there is shown a perspective view of a mounting system 70, in accordance with yet another embodiment of the present invention. The mounting system 70 includes a holding device 12, an attaching means 60, and a flexible connector 51 extending between the holding device 12 and attaching means 60. The holding device 12 and flexible connector 51 include the same features and elements as described above in regards to the holding device 12 and flexible connector 51 of FIGS. 7-9. The main difference is that the attaching means 60, of this alternative embodiment of the invention, comprises a spring clamp configuration. Spring clamp 60 includes a first jaw member 62 pivotably attached to a second jaw member 64, via a compression spring 65. When a user rotates the jaws 62, 64 around the fulcrum 65, the holding device is opened. The jaws 62, 64 compress together via, the compression spring 65, forcing the holding members 67, 68 to engage a structure 39 such as a desk, chair, bed frame, table, door, or bookcase. The distal end of a flexible connector 51 rotates relatively to joint 53 which is coupled to spring clamp 60, via joint coupler 66. The mounting system 70 provides yet another adjustable holding device for holding an electronic device while freeing the hands of a user. Advantageously, the mounting system 70 may be transported and installed at different locations.

FIGs. 11-13 provide still another embodiment of the mounting system 80, where the holding device 82 is defined by a closure 84 pivotably attached to a U-shaped frame 86. The U-shaped frame 86 is designed to engage with the lower edge and side peripheral edges of the tablet 101 by including a frame 86 having a perimetral slot formed therein in which the tablet computer 101 can be firmly inserted. An articulated closure 84 is pivotably closed to cover the top peripheral edge of the tablet 101 securing the tablet 101 in place. The closure 84 is simply opened to gain access to the tablet 101. As seen in FIG. 12, the back of the tablet 101 is open and unrestricted allowing a user to gain access to the back of the tablet 101, if needed.

As better illustrated in FIGS. 12 and 13, frame 86 further includes a vertical attachment plate 87 for attaching the proximal end of flexible connector 14 to the holding device 82, via, joint 30. Joint 30 may include a swivel ball to allow frame 86 to pivot and rotate freely at the end of flexible connector 14. Joint 30 and the flexible connector 14 provide a combinational benefit of permitting a user to adjust the mounting system 80 is a variety of different positions when holding the tablet computer 101. This combined benefit provides for an optimum mounting system that is versatile, easy to use, and accommodating in freeing a user's hands.

Figure 14:
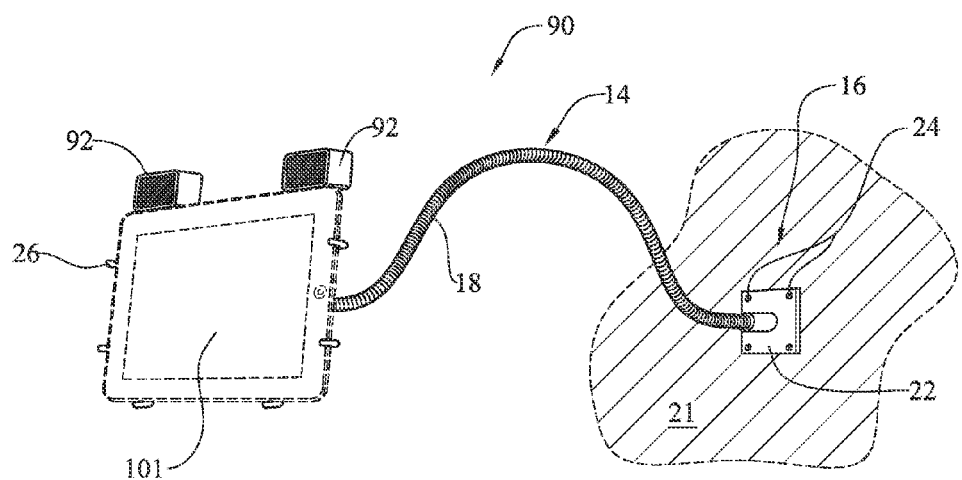
FIG. 14 is a perspective view of a mounting system, showing another embodiment in which the holding device including a set of speakers disposed on the holding device, in accordance with another embodiment of the present invention.

Turning to FIG. 14 there is shown a perspective view of a mounting system 90, in accordance with another embodiment of the present invention. The flexible connector 14 and attachment means 16 include identical features and elements as shown in FIG. 1-3, with the addition of one or more speakers 92 being mounted to the holding device 12. One or more speakers 92 are implemented in the mounting system 90 to allow a user to hear audio from the tablet computer 101 without requiring a user to wear headphones or relying on the audio speaker of the tablet 101 itself. The speakers 92 are electrically connected to a dedicated audio port located on the tablet computer 101, or alternatively, speakers 92 may comprise wireless speakers that are in electrical communication with tablet 101. Speakers 92 are permanently or removably attached to the holding device 12 using any suitable fasteners.

Figure 15:
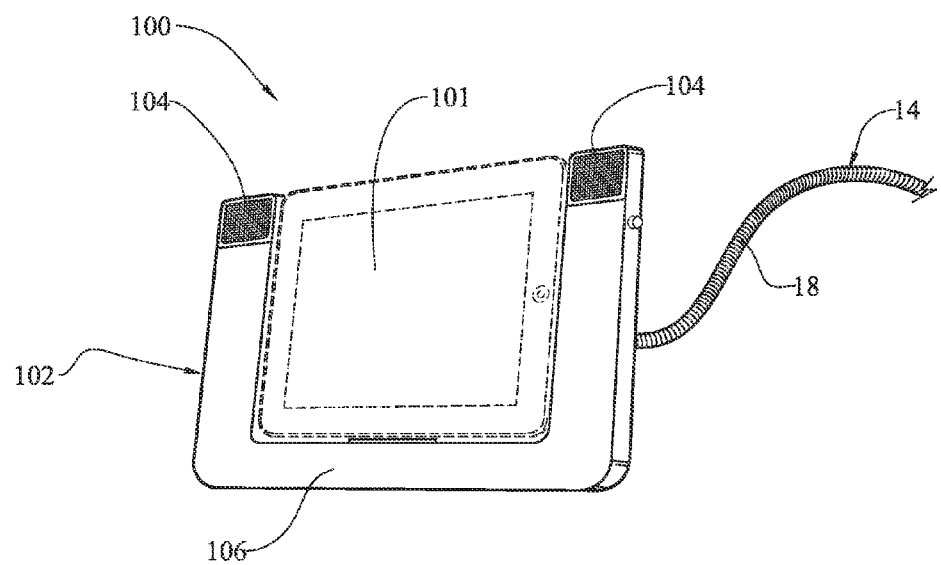
FIG. 15 is a perspective partial view of a mounting system, showing yet another embodiment of a holding device having speakers mounted to an alternative embodiment of a holding device, in accordance with another embodiment of the present invention.

An alternative embodiment is also shown in FIG. 15, where a mounting system 100 includes an alternative holding device 102. Holding device 102 comprises a U-shaped holding frame 106 for holding a tablet computer 101, and a pair of audio speakers 104 incorporated within the U-shaped holding frame 106 and electrically coupled to the tablet 101 for providing an external audio means. The U-shaped holding frame 106 may be constructed from plastic or metal, and may include fasteners, attachments, apertures, or any other suitable mechanical mechanism used in securing the tablet computer 101 in place. One end of flexible connector 14 is attached to frame 106 to allow the user to freely adjust the tablet 101, and the other end of a flexible connector 14 is attached to an attaching means 16 or 60, as illustrated in FIGS. 1 and 10, for permanently or releasable attaching the mounting system 100 to a wall, surface or object.

Figure 16:
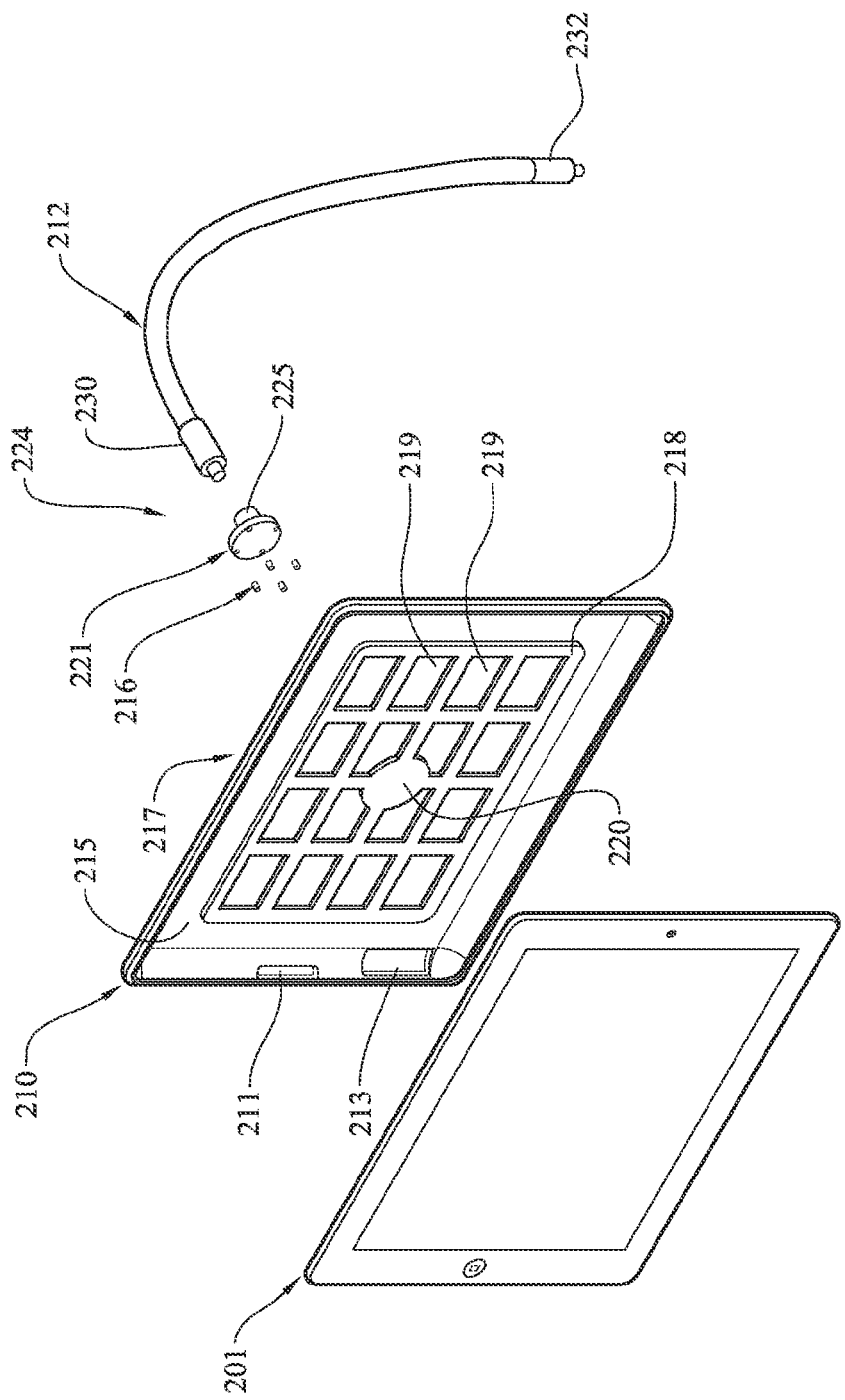
FIG. 16 is an exploded view of a mounting system, in accordance with yet another embodiment of the present invention, showing the details of a holding device and flexible gooseneck connector.

FIG. 16 shows an exploded view of a mounting system 200, in accordance with another embodiment of the present invention. The mounting system 200 includes a holding unit 210 coupled to a flexible gooseneck connector 212, via an attachment 224. The flexible gooseneck connector 212 comprises a flexible metal rod surrounded by a rubber or elastic sleeve. End connectors 230, 232 are disposed at opposite ends of the flexible connector 212 for attaching one end of the gooseneck connector 212 to the holding unit 210 and an opposite end to a wall or object.

The holding unit 210 is generally rectangular in shape, and integrally formed as one piece having a cavity 215 for holding a tablet computer 201. The unit 210 includes a rubber or elastic overmold disposed around the perimeter of the holding unit 210. The overmold includes a steel insert, and provides for frictional engagement with the tablet 201 when the tablet 201 is placed within the cavity 215 of the holding unit 210. The holding unit 210 also includes a number of openings 211, 213 permitting a user to interconnect cables, power cords or the like with a tablet computer 201, if needed. It will be understood that the openings 211, 213 may be located anywhere within the holding unit 210 including the rear panel 217. The holding unit 210 further includes a back panel 218 having a plurality of crevices 219 that help reduce the weight of the unit 210 and help dissipate any heat that may be circulating within the cavity 215. The back panel 218 may be integrally formed with the holding unit 210 or separately attached to the inner surface of the back panel 217, within cavity 215. Back panel 218 includes a metal attachment surface 220, shown as a round segment in the middle of the panel 218, for attaching an attaching means 224 thereto.

In the preferred embodiment, attaching means 224 includes a threaded collar 221 having a plurality of apertures for holding magnets 216 therein, and a tubular boss 225 formed on one surface of the collar 221 for receiving connector 230. Connector 230 may be threaded, welded, or soldered within the tubular boss 225 of the metal base 221. The flexible gooseneck connector 212 is magnetically attached to the attachment surface 220 of the back panel 218 of the holding unit 210 such that the magnets 216 strongly adhere to the metal surface 220. To reduce the number of parts, in one alternative embodiment, the plurality of magnets 216 may comprise a single magnet.

Figure 18:
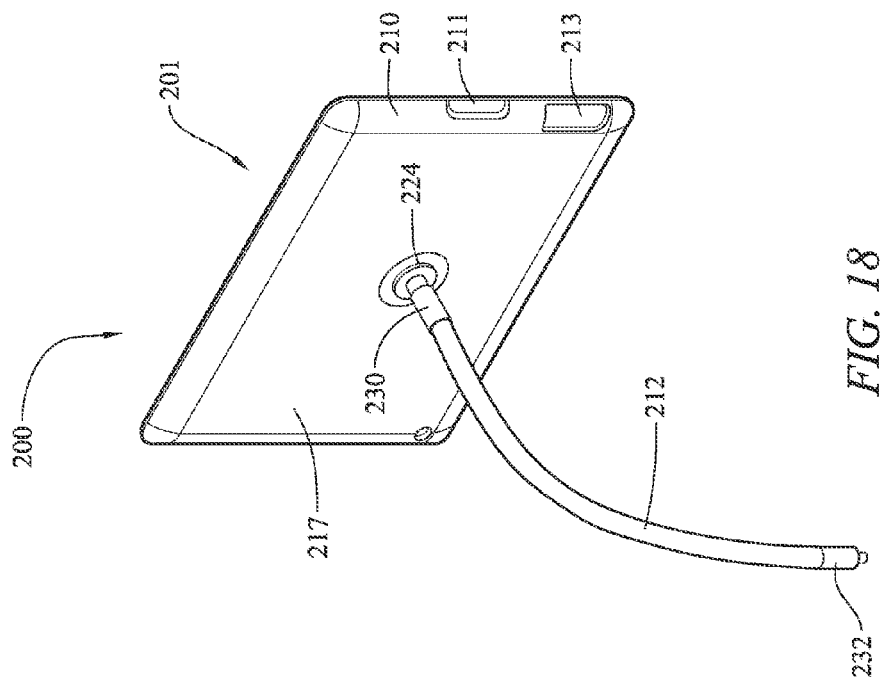
FIG. 18 is a rear perspective view of the mounting system of FIGS. 16 and 17.
Figure 17:
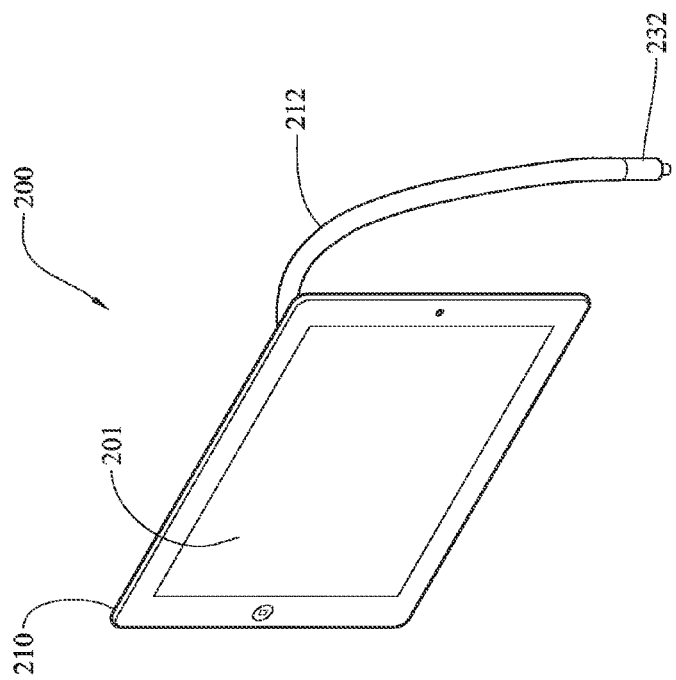
FIG. 17 is a front perspective view of the mounting system of FIG. 16; and finally.

As shown in FIGs. 17 and 18, a tablet computer 201 is inserted within the cavity 215 of the holding unit 210 allowing the rubber or elastic overmold to frictionally engage with the outer perimeter of the tablet 201 thereby securely holding the tablet 201 in place. As seen in FIG. 18, flexible connector 212 is magnetically attached to the back panel 218 of the holding unit 210, via magnetic attaching means 224. Openings 211, and 213 operatively align with interface ports or power receptacles located on the tablet 201 to allow easy access to the ports, if needed. Connector 232 is attached to a wall mount 16, a spring clamp 30, or connecting base to provide an adjustable, mounting system 200 for a tablet computer 201.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What we claim is:

1. A tablet computer mounting device, said mounting device comprising:
    a holding unit defining a tablet computer receiving cavity, said holding unit including a rectangular planar tablet support panel, a holding unit peripheral tablet support sidewall extending upwards from a peripheral edge of said rectangular planar tablet support panel, and an upper rim circumscribing an upper edge of said peripheral tablet support sidewall and an opening of said tablet computer receiving cavity, said peripheral tablet support sidewall sized and shaped to follow a peripheral edge of a tablet computer and said peripheral tablet support sidewall sized and shaped to frictionally secure said tablet computer within said tablet computer receiving cavity;
    a back panel comprising a planar metal attachment surface, said back panel affixed to an interior bottom surface of said tablet computer receiving cavity, a rear surface of said back panel being substantially coplanar with said rectangular planar tablet support panel;
    a magnetic attachment device including a gooseneck attachment end and a holding unit attachment end, said holding unit attachment end defining a plurality of magnet receiving apertures and a plurality of magnets disposed in said plurality of magnet receiving apertures, said holding unit attachment end selectively affixed to a rear surface of said holding unit by a magnetic attraction between said plurality of magnets and said planar metal attachment surface of said back panel; and
    a flexible gooseneck having a first end attached to said gooseneck attachment end and a second end selectively secured to one of a wall mount, a spring clamp, and a base.

2. The tablet computer mounting device of claim 1, wherein said flexible gooseneck includes a bendable rod having one of a rubber and an elastic sleeve disposed over said rod.

3. The tablet computer mounting device of claim 1, wherein said back panel further comprises a top surface forming a plurality of depressions, said plurality of depressions defining a plurality of back panel cavities, wherein each of said plurality of back panel cavities includes an opening configured to engage a rear surface of said tablet computer when said tablet computer is secured within said tablet computer receiving cavity.

4. The tablet computer mounting device of claim 1, wherein said holding unit is made of rubber.

5. The tablet computer mounting device of claim 1, wherein said back panel is integral with said rectangular planar tablet support panel.

6. The tablet computer mounting device of claim 1, wherein said second end of said flexible gooseneck is selectively secured to a spring clamp, said spring clamp comprising a pair of clamping jaws pivotally affixed to one another and said pair of clamping jaws compressed together by a spring.

7. The tablet computer mounting device of claim 1, wherein said holding unit further includes at least one through-hole formed within said rear surface of said holding unit, said at least one through-hole sized and configured to receive tablet computer cables therethrough.

8. A tablet computer mounting device, said mounting device comprising:

a holding unit defining a tablet computer receiving cavity, said holding unit including a rectangular planar tablet support panel, a holding unit peripheral tablet support sidewall extending upwards from a peripheral edge of said rectangular planar tablet support panel, and an upper rim circumscribing an upper edge of said peripheral tablet support sidewall and an opening of said tablet computer receiving cavity, said peripheral tablet support sidewall sized and shaped to follow a peripheral edge of a tablet computer and said peripheral tablet support sidewall sized and shaped to frictionally secure said tablet computer within said tablet computer receiving cavity;

a back panel comprising:

a planar metal attachment surface, a top surface forming a plurality of depressions, said plurality of depressions defining a plurality of back panel cavities, wherein each of said plurality of back panel cavities includes an opening configured to engage a rear surface of said tablet computer when said tablet computer is secured within said tablet computer receiving cavity, and a rear surface being substantially coplanar with said rectangular planar tablet support panel, wherein said back panel is affixed to an interior bottom surface of said tablet computer receiving cavity;

a magnetic attachment device including a gooseneck attachment end and a holding unit attachment end, said holding unit attachment end defining a plurality of magnet receiving apertures and a plurality of magnets disposed in said plurality of magnet receiving apertures, said holding unit attachment end selectively-affixed to a rear surface of said holding unit by a magnetic attraction between said plurality of magnets and said planar metal attachment surface of said back panel; and a flexible gooseneck having a first end attached to said gooseneck attachment end and a second end selectively secured to a spring clamp.

9. The tablet computer mounting device of claim 8, wherein said holding unit is made of rubber.

10. The tablet computer mounting device of claim 8, wherein said back panel is integral with said rectangular planar tablet support panel.

11. The tablet computer mounting device of claim 8, wherein said spring clamp comprises a pair of clamping jaws pivotally affixed to one another and said pair of clamping jaws compressed together by a spring.

12. The tablet computer mounting device of claim 8, wherein said holding unit further includes at least one through-hole formed within said rear surface of said holding unit, said at least one through-hole sized and configured to receive tablet computer cables therethrough.

\* \* \* \* \*